(12) United States Patent
Anderson et al.

(10) Patent No.: US 7,370,158 B2
(45) Date of Patent: May 6, 2008

(54) SIMD PROCESS WITH MULTI-PORT MEMORY UNIT COMPRISING SINGLE-PORT MEMORIES

(75) Inventors: Adrian John Anderson, Llanishen (GB); Gary Christopher Wass, St. Albans (GB)

(73) Assignee: Imagination Technologies Limited, Hertfordshire (GB)

( * ) Notice: Subject to any disclaimer, the term of this patent is extended or adjusted under 35 U.S.C. 154(b) by 198 days.

(21) Appl. No.: 11/397,316

(22) Filed: Apr. 4, 2006

(65) Prior Publication Data

US 2006/0259717 A1    Nov. 16, 2006

Related U.S. Application Data

(63) Continuation-in-part of application No. 10/404,912, filed on Apr. 1, 2003, now abandoned.

(30) Foreign Application Priority Data

Dec. 5, 2002   (GB) ................... 0228440.4

(51) Int. Cl.
G06F 12/00   (2006.01)
(52) U.S. Cl. ..................................... 711/149
(58) Field of Classification Search ............... None
See application file for complete search history.

(56) References Cited

U.S. PATENT DOCUMENTS 5,522,080 A    5/1996  Harney
5,669,010 A    9/1997  Duluk, Jr.
5,832,291 A   11/1998  Rosen et al.
6,189,073 B1   2/2001  Pawlowski
6,212,607 B1   4/2001  Miller et al.
6,282,505 B1   8/2001  Hanawa et al.
6,426,843 B1   7/2002  Lamberts et al.
6,434,674 B1   8/2002  DeWilde et al.
6,671,747 B1  12/2003  Benkual et al.
6,732,247 B2   5/2004  Berg et al.

FOREIGN PATENT DOCUMENTS

| EP | 0 881 575 A1 | 12/1998 |
| GB | 2 311 153 A | 9/1997 |
| GB | 2 395 306 A | 5/2004 |
| GB | 2 396 031 A | 6/2004 |

OTHER PUBLICATIONS

U.S. Appl. No. 10/358,985, filed Feb. 2003 (U. S. equivalent to British Application No. 0226732.6 mentioned in the Specification).
European Patent Office International Search Report dated May 25, 2004 (3 pages).
United Kingdom Patent Office Search Report dated Jul. 30, 2003 (1 page).

*Primary Examiner*—Kevin Verbrugge
(74) *Attorney, Agent, or Firm*—Flynn, Thiel, Boutell & Tanis, P.C.

(57) ABSTRACT

A plurality of single port memories are provided for use with a single instruction multiple data processor. These are operable as a multi-port memory with simultaneous access to the plurality of single port memories. The apparatus is operable to send an access request for a plurality of memory locations to the locations in a known order. This request is then reordered to be suitable for application to the single port memories. The memories are then accessed and the data reordered to conform with the access request format.

18 Claims, 13 Drawing Sheets

| clock cycle | RAM cell 0 | RAM cell 1 | RAM cell 2 | RAM cell 3 |
| --- | --- | --- | --- | --- |
| t + 0 | read B + 0 | read B + 1 | read B + 2 | read B + 3 |
| t + 1 | - | - | - | - |
| t + 2 | read B + 4 | read B + 5 | read B + 6 | read B + 7 |
| t + 3 | - | - | - | - |
| t + 4 | read B + 8 | read B + 9 | read B + 10 | read B + 11 |
| t + 5 | - | - | - | - |
| t + 6 | read B + 12 | read B + 13 | read B + 14 | read B + 15 |
| t + 7 | write B + 0 | write B + 1 | write B + 2 | write B + 3 |
| t + 8 | read B + 16 | read B + 17 | read B + 18 | read B + 19 |
| t + 9 | write B + 4 | write B + 5 | write B + 6 | write B + 7 |
| t + 10 | read B + 20 | read B + 21 | read B + 22 | read B + 23 |
| t + 11 | write B + 8 | write B + 9 | write B + 10 | write B + 11 |
| t + 12 | read B + 24 | read B + 25 | read B + 26 | read B + 27 |
| t + 13 | write B + 12 | write B + 13 | write B + 14 | write B + 15 |

Figure 4

| clock cycle | RAM cell 0 | RAM cell 1 | RAM cell 2 | RAM cell 3 |
| --- | --- | --- | --- | --- |
| t + 0 | read B + 0 | - | - | - |
| t + 1 | read B + 4 | - | - | - |
| t + 2 | read B + 8 | read B + 1 | - | - |
| t + 3 | read B + 12 | read B + 5 | - | - |
| t + 4 | - | read B + 9 | read B + 2 | - |
| t + 5 | - | read B + 13 | read B + 6 | - |
| t + 6 | - | - | read B + 10 | read B + 3 |
| t + 7 | - | - | read B + 14 | read B + 7 |
| t + 8 | read B + 16 | - | - | read B + 11 |
| t + 9 | read B + 20 | - | - | read B + 15 |
| t + 10 | read B + 24 | read B + 17 | - | - |
| t + 11 | read B + 28 | read B + 21 | - | - |
| t + 12 | write B + 0 | read B + 25 | read B + 18 | - |
| t + 13 | write B + 4 | read B + 29 | read B + 22 | - |
| t + 14 | write B + 8 | write B + 1 | read B + 26 | read B + 19 |
| t + 15 | write B + 12 | write B + 5 | read B + 30 | read B + 23 |
| t + 16 | read B + 32 | write B + 9 | write B + 2 | read B + 27 |
| t + 17 | read B + 36 | write B + 13 | write B + 6 | read B + 31 |
| t + 18 | read B + 40 | read B + 33 | write B + 10 | write B + 3 |
| t + 19 | read B + 44 | read B + 37 | write B + 14 | write B + 7 |
| t + 20 | write B + 16 | read B + 41 | read B + 34 | write B + 11 |
| t + 21 | write B + 20 | read B + 45 | read B + 38 | write B + 15 |
| t + 22 | write B + 24 | write B + 17 | read B + 42 | read B + 35 |

Figure 5 cycle 0

| | req a | req b | req c | req d |
|---|---|---|---|---|
| | Aa0 | Ab0 | Ac0 | Ad0 |

| | 0 | 1 | 2 | 3 |
|---|---|---|---|---|
| R1 | | | | |
| R2 | | | | |
| R3 | | | | |
| R4 | | | | | cycle 1

| | req a | req b | req c | req d |
|---|---|---|---|---|
| | Ba0 | Bb0 | Bc0 | Bd0 |

| | 0 | 1 | 2 | 3 |
|---|---|---|---|---|
| R1 | Ad | | | |
| R2 | Ac | | | |
| R3 | Ab | | | |
| R4 | Aa | | | | cycle 2

| | req a | req b | req c | req d |
|---|---|---|---|---|
| | | Bb0 | Bc0 | Bd0 |

| | 0 | 1 | 2 | 3 |
|---|---|---|---|---|
| R1 | Ba | | | |
| R2 | Ad | | | |
| R3 | Ac | | | |
| R4 | Ab | | | | cycle 3

| | req a | req b | req c | req d |
|---|---|---|---|---|
| | | | Bc0 | Bd0 |

| | 0 | 1 | 2 | 3 |
|---|---|---|---|---|
| R1 | Bb | | | |
| R2 | Ba | | | |
| R3 | Ad | | | |
| R4 | Ac | | | | cycle 4

| | req a | req b | req c | req d |
|---|---|---|---|---|
| | | | | Bd0 |

| | 0 | 1 | 2 | 3 |
|---|---|---|---|---|
| R1 | Bc | | | |
| R2 | Bb | | | |
| R3 | Ba | | | |
| R4 | Ad | | | | cycle 5

| | req a | req b | req c | req d |
|---|---|---|---|---|
| | Ca1 | Cb1 | Cc1 | Cd1 |

| | 0 | 1 | 2 | 3 |
|---|---|---|---|---|
| R1 | Bd | | | |
| R2 | Bc | | | |
| R3 | Bb | | | |
| R4 | Ba | | | | cycle 6

| | req a | req b | req c | req d |
|---|---|---|---|---|
| | Da2 | Db2 | Dc2 | Dd2 |

| | 0 | 1 | 2 | 3 |
|---|---|---|---|---|
| R1 | | Cd | | |
| R2 | Bd | Cc | | |
| R3 | Bc | Cb | | |
| R4 | Bb | Ca | | |

Figure 6 cycle 7

| req a | req b | req c | req d |
|---|---|---|---|
| Ea3 | Eb3 | Ec3 | Ed3 |

|    | 0  | 1  | 2  | 3  |
|----|----|----|----|----|
| R1 |    |    | Dd |    |
| R2 |    | Cd | Dc |    |
| R3 | Bd | Cc | Db |    |
| R4 | Bc | Cb | Da |    | cycle 8

| req a | req b | req c | req d |
|---|---|---|---|
| Fa0 | Fb1 | Fc2 | Fd3 |

|    | 0  | 1  | 2  | 3  |
|----|----|----|----|----|
| R1 |    |    |    | Ed |
| R2 |    |    | Dd | Ec |
| R3 |    | Cd | Dc | Eb |
| R4 | Bd | Cc | Db | Ea | cycle 9

| req a | req b | req c | req d |
|---|---|---|---|
| Ga0 | Gb1 | Gc2 | Gd3 |

|    | 0  | 1  | 2  | 3  |
|----|----|----|----|----|
| R1 |    |    |    | Fd |
| R2 |    |    | Fc | Ed |
| R3 |    | Fb | Dd | Ec |
| R4 | Fa | Cd | Dc | Eb | cycle 10

| req a | req b | req c | req d |
|---|---|---|---|
| Ha0 | Hb1 | Hc2 | Hd3 |

|    | 0  | 1  | 2  | 3  |
|----|----|----|----|----|
| R1 |    |    |    | Gd |
| R2 |    |    | Gc | Fd |
| R3 |    | Gb | Fc | Ed |
| R4 | Ga | Fb | Dd | Ec | cycle 11

| req a | req b | req c | req d |
|---|---|---|---|
| Ia0 | Ib1 | Ic2 | Id3 |

|    | 0  | 1  | 2  | 3  |
|----|----|----|----|----|
| R1 |    |    |    | Hd |
| R2 |    |    | Hc | Gd |
| R3 |    | Hb | Gc | Fd |
| R4 | Ha | Gb | Fc | Ed | cycle 12

| req a | req b | req c | req d |
|---|---|---|---|
|  |  |  |  |

|    | 0  | 1  | 2  | 3  |
|----|----|----|----|----|
| R1 |    |    |    | Id |
| R2 |    |    | Ic | Hd |
| R3 |    | Ib | Hc | Gd |
| R4 | Ia | Hb | Gc | Fd | cycle 13

| req a | req b | req c | req d |
|---|---|---|---|
|  |  |  |  |

|    | 0  | 1  | 2  | 3  |
|----|----|----|----|----|
| R1 |    |    |    |    |
| R2 |    |    |    | Id |
| R3 |    |    | Ic | Hd |
| R4 |    | Ib | Hc | Gd |

SIMD PROCESS WITH MULTI-PORT MEMORY UNIT COMPRISING SINGLE-PORT MEMORIES

CROSS REFERENCE TO RELATED APPLICATION

This application is a continuation in part of U.S. Ser. No. 10/404,912, filed Apr. 1, 2003, now abandoned the disclosure of which is hereby incorporated by reference.

FIELD OF THE INVENTION

This invention relates to a method and apparatus for accessing a plurality of single port memories such that they operate as a multi-port memory unit.

BACKGROUND OF THE INVENTION

In British patent application number 0226732.6 an architecture is described which supports demodulation of a wide range of analogue and digital signal formats. One key element of that architecture is a single instruction multiple data (SIMD) programmable processor which is closely coupled to a memory unit which provides access to multiple data words in each clock cycle. In one embodiment of the invention, it is necessary to read or write four independent data values in each clock cycle.

In U.S. Pat. No. 5,669,010: "cascaded two-stage computational SIMD engine having multi-port memory and multiple arithmetic units", a number of SIMD processor arrangements are described which consist of a number of arithmetic units and multi-port memories. This patent does not describe how to build a suitable multi-port memory using single-ported Memories.

In U.S. Pat. No. 6,189,073: "Method of emulating dual-port memory device using an internally-cached static random access memory architecture", a hierarchical caching arrangement of memories is described which gives dual-port access to a large single-port memory. This arrangement is not suitable for an SIMD processor such as the one described in British patent application number 0226732.6.

In U.S. Pat. No. 6,434,674: "Multi-port memory architecture with direct data flow", an arrangement is described which gives multi-port access to a large single-port memory which has wider data bus width and faster cycle time than the memory ports. This arrangement is not suitable for an SIMD processor such as the one described in British patent application number 0226732.6.

In U.S. Pat. No. 6,282,505: "Multi-port memory and a data processor accessing the same", an arrangement is described which gives dual-port access to two independent single-port memories by allocating each of the two input ports to each of the two memories on successive clock cycles. This arrangement is not suitable for an SIMD processor such as the one described in British patent application number 0226732.6.

In U.S. Pat. No. 6,212,607: "Multi-ported memory architecture using single-ported RAM", an arrangement is described which gives multi-port access to a number of independent single-port memories using a combination of bus grant signals, interrupts and mailboxes. This arrangement allows multiple processing devices to share a common memory area, but the arrangement is not suitable for a SIMD processor such as the one described in British patent application number 0226732.6.

The preferred embodiment of the invention described here provides an efficient structure for implementation of the multi-port memory required in a processor of the type described in British patent application number 0226732.6 using a plurality of single-port memories.

A SIMD processor such as the one described in British patent application number 0226732.6 requires a multi-port memory providing N independent accesses to memory in one clock cycle. A conventional multi-port semiconductor memory allowing N simultaneous independent accesses per clock cycle is in general larger than N independent single-port semiconductor memories with the same total storage capacity as the multi-port memory. The larger size is due to the extra circuitry required to provide multiple independent accesses to each memory cell. In a semiconductor chip which requires a multi-port memory it is desirable to minimise the chip area occupied by the memory. An arrangement that provides multi-port access to a plurality of single-port memories can provide a significant reduction in chip area for a given memory storage capacity.

SUMMARY OF THE INVENTION

In a preferred embodiment of the invention there is provided an arrangement of a plurality of single-port memories together with a method of accessing the individual memories which provides an efficient multi-port memory structure for use in a SIMD processor such as the one described in British patent application number 0226732.6. The SIMD processor typically operates on a regularly-spaced sequence of data samples to calculate another regularly-spaced sequence. The SIMD processor operation is defined in such a way that it can operate effectively using a multi-port memory unit consisting of a number of single-port memories with a re-ordering buffer attached to the memory read ports and a separate re-ordering buffer attached to the memory write ports. The arrangement described here provides N independent accesses to a unified memory space in one clock cycle for many frequently-used patterns of memory access. For patterns of memory access that require more than one clock cycle to provide N independent memory accesses the arrangement described automatically introduces stall cycles in the processor operation.

BRIEF DESCRIPTION OF THE DRAWINGS

FIG. 4 shows an example RAM cell access sequence for sequential read and write operations;

FIG. 5 shows an example RAM cell access sequence for radix4 FFT operations;

DETAILED DESCRIPTION

Figure 1:
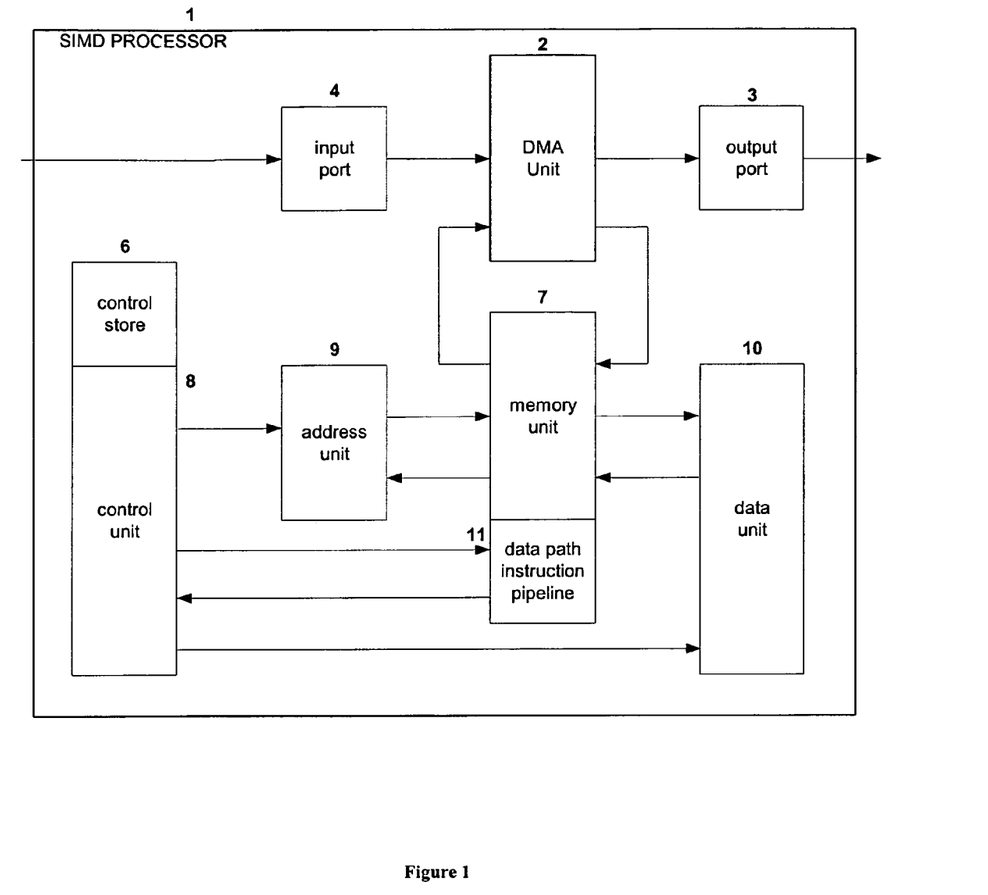
FIG. 1 shows a block diagram of a SIMD processor which utilises a memory unit structured embodying the invention.

The SIMD processor 1 in FIG. 1 is an arrangement of a programmable data processing unit 10 with close-coupled high-speed memory 7 and a DMA controller 2. In this example, two external ports have access to the memory unit via the DMA unit. The two ports are an input port 4 and an output port 3.

The operation of the SIMD processor 1 is controlled by instructions held in the control store 6. Very long instruction word (VLIW) instructions are fetched from the control store 6 and are decoded by the control unit 8 to control both the address unit 9 and the data unit 10. The address unit 9 receives instructions from the control unit 8 which cause it to generate requests for read or write operations. The data unit 10 receives instructions from the control unit 8 which cause it to perform operations on data held in its registers.

Registers in the data unit 10 or the address unit 9 can be loaded with data read from the memory unit 7 when the address unit 9 issues a read request.

The contents of registers in the data unit 10 or the address unit 9 can be written to memory when the address unit 9 issues a write request.

There is a delay between the generation of a read request by the address unit 9 and the arrival of valid data for loading into registers. This memory read delay is hidden from the programmer by subjecting the data unit instructions to the same delay as the associated memory read accesses using a data path instruction pipeline 11 within the memory unit 7.

In this example, the address unit 9 can issue four independent read or write requests per clock cycle. The data unit 10 contains a number of arithmetic operations units, each of which can perform arithmetic operations on four independent items of data in one clock cycle.

Figure 2:
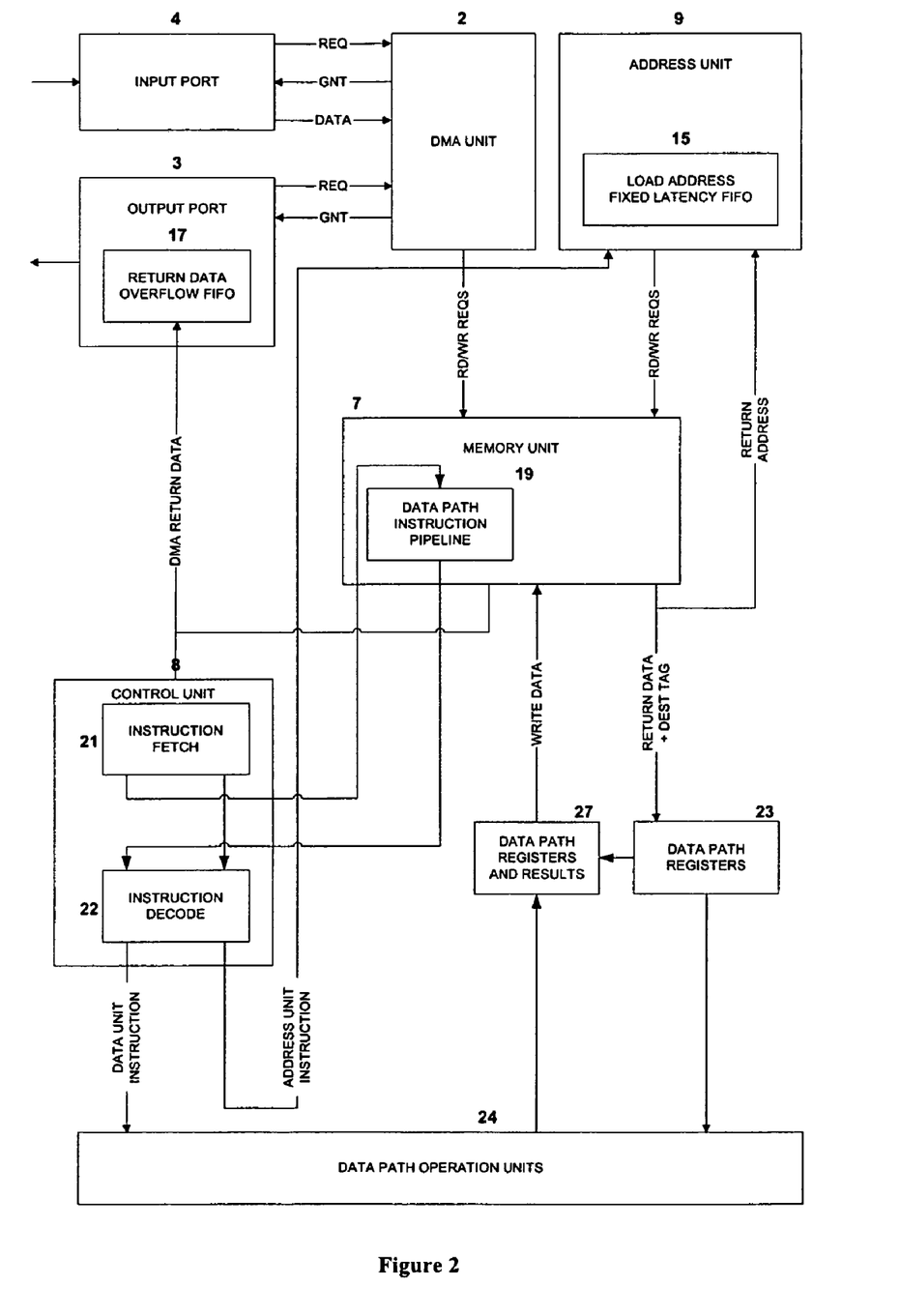
FIG. 2 shows the connectivity of the memory unit within the SIMD processor system.

FIG. 2 provides a more detailed view of the connectivity of memory unit 7 within the SIMD processor.

Input port 4 and output port 3 issue requests to the DMA unit 2, which in turn issues read and write requests to the memory unit 7. When an input sample is presented at input port 4, a write request and associated data is passed to the memory unit 7 via the DMA unit 2. Data to be sent to output port 3 is obtained by a read request which is passed to the memory unit 7 via the DMA unit 2. If the memory unit 7 is busy when it receives a request from DMA unit 2, the memory unit 7 can stall the issued DMA request and service the request at a later time. The output port 4 contains a FIFO 17 to hold data which has been requested ahead of the time it is required for output. The output port FIFO ensures that output data is available when required even though requests to the memory unit 7 may be stalled for some time in order to allow other memory access requests to proceed.

The control unit 8 sends load and store instructions to the address unit 9, which in turn sends read requests and write requests to the memory unit 7. The operation of the memory unit 7 is such that there is a delay between a read request and the arrival of valid read data from the memory unit 7. Correct operation of the data unit 10 is ensured by the insertion of a delay in the data unit instruction flow which compensates for the delay in arrival of data from the memory unit 7.

The delay in the data unit instruction flow is implemented by the data path instruction pipeline 11, which delays each data unit instruction by a fixed number of clock cycles. When the SIMD processor is executing instructions at full speed with no stalling, the delay provided by the data path instruction pipeline 11 ensures that each data unit operation is executed when the read data requested for that operation arrives from the memory unit 7.

When the memory unit 7 cannot provide the read data required by a data path instruction, then the data path instruction pipeline 11 is stalled until the data is available. This situation may arise either due to memory accesses by the DMA unit 2 taking priority over read requests from the address unit 9, or due to the memory unit 7 being unable to access the requested sequence of memory addresses in the number of clock cycles available. In either case the result is a stall cycle in the SIMD processor operation.

The data path instruction pipeline 11 balances the delays of memory read and data unit operations, simplifying the writing of code for the SIMD processor. For example, the programmer may write an instruction to execute the following two operations in one clock cycle:

the address held in register P in the address unit 9 is used to access the memory unit 7 to load a data register in the data unit;

the address held in register P in the address unit 9 is incremented by one.

Due to the balancing of the delays of memory read and data unit operations, these two operations complete at the same time and the results are available in registers for use on the next instruction.

When the data from a read request operation is used to load a register in the address unit 9, then the memory read latency cannot be hidden from the programmer in the way that it is for data unit operations. As the latency cannot be hidden, its effect is minimized by ensuring that the content of an address register targeted by a load address instruction is changed after a fixed number of instructions have been issued following the load address instruction. The load address fixed latency FIFO 15 is included in the return path from the memory unit 7 to the address unit 9, and its operation ensures that a fixed number of instructions is issued in between a load address instruction and the changing of the target register contents. This allows the programmer to predict exactly when in a sequence of instructions a load address operation will take effect, and to code appropriately.

Figure 3:
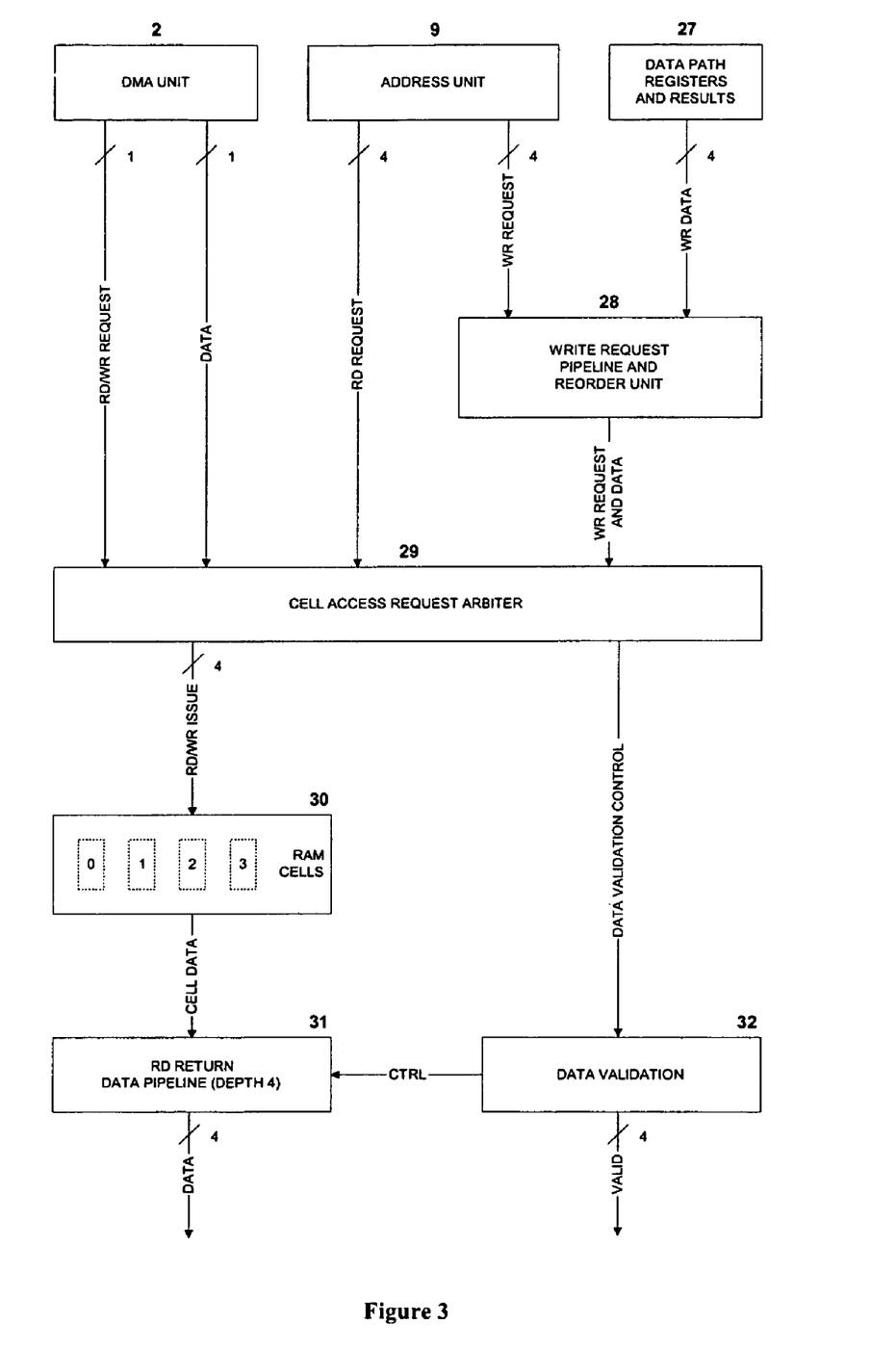
FIG. 3 shows the structure of the memory unit.

FIG. 3 shows the internal arrangement of the memory unit 7. The DMA unit 2 may issue a single read or write request in one clock cycle, whereas the address unit 9 may generate four read or write requests in one clock cycle. The four memory access requests are issued directly to the cell access request arbiter 29 for reads, but are first passed through a write request pipeline and reorder unit 28 in the case of writes. The write request pipeline 28 performs delay balancing in the same manner as the data path instruction pipeline 11 to ensure that the correct data path registers and results 27 are selected for storage.

In this example the address unit 9 issues four requests per clock cycle to access the memory unit 7. The four memory addresses to be accessed may be unrelated, but frequently they will be related by the equation:

$$A_n = B + n.K \quad (n=0, 1, 2, 3) \tag{1}$$

where $A_n$ is one of the four addresses,

B is a base address and K is the spacing between memory locations

If the SIMD processor is performing an operation such as multiplying every element in a vector by a constant value, then it will be reading from sequential locations and writing to sequential locations, and in equation (1) the value of K is 1. In other operations such as fast fourier transform (FFT) calculation, the value of K may be any power of two.

The storage in the memory unit is held in the RAM cells block 30, which holds four independent RAM cells numbered 0 to 3. The allocation of memory addresses to individual RAM cells is chosen to maximise memory efficiency for typical processor operations. RAM cell M contains memory locations 4N+M, where N is an integer and M takes the values 0, 1, 2 and 3. Thus any sequence of four sequential memory locations can be accessed in a single cycle from the four independent RAM cells.

FIG. 4 shows the sequence of read and write operations performed by RAM cells 0 to 3 when the SIMD processor is reading and writing sequential memory locations, as would be the case when multiplying every element in a vector by a constant value. FIG. 4 illustrates that after the initial pipeline setup each RAM cell is performing an operation on every clock cycle, showing that the memory is used at maximum efficiency.

When executing an FFT, butterfly operations combine data from a number of locations separated by $2^R$, where R is an integer. Over the course of the FFT calculation, R takes a number of values between 0 and a positive power of two. In all cases except when R=0, the sequence of addresses generated by the address unit 9 will target multiple accesses to a single RAM cell in a single clock cycle.

Stall cycles are avoided in an FFT calculation by structuring the FFT code to use radix-4 butterflies. At each stage of the FFT, the order of butterfly execution is arranged so that any group of four sequential radix-4 butterflies within the FFT stage perform exactly four reads and four writes to each RAM cell.

FIG. 5 shows the sequence of read and write operations performed by RAM cells 0 to 3 when the SIMD processor is performing an FFT calculation using radix-4 butterflies with a data spacing of 4 locations. FIG. 5 illustrates that after the initial pipeline set-up each RAM cell is performing an operation on every clock cycle, showing that the memory is used at maximum efficiency.

The four reads to each RAM cell are re-ordered by the cell access request arbiter 29, and the data read from the RAM cells is re-ordered again by the RD return data pipeline 31 to ensure that the data appears at the data unit 10 in the required order. The output of the return data pipeline is validated by the return data validation unit 32 to ensure that associated register loads and data operations only proceed when valid data is available.

The four writes to each RAM cell pass through the write request pipeline and reorder unit 28 which buffers the write requests and holds them until data can be written to the appropriate RAM cell. The combination of the buffering and re-ordering on the read path and the write path allows the SIMD processor to perform the FFT function at the full speed allowed by the memory with no stall cycles.

The same memory accessing sequence shown in FIG. 5 may be used for FFT butterflies with data spacing greater than 4. It may also be used to achieve efficient memory utilisation for other processor operations which access non-sequential memory locations.

The write request buffer and reordering pipeline 28 can accept and buffer many write requests before it must write them to the RAM cells. Typically the write request buffer and reordering pipeline 28 may be sized to hold 20 independent write requests and associated data. Access to each RAM cell in block 30 is prioritized by the cell access request arbiter 29, which gives highest priority to requests from the DMA unit 2 and second-highest priority to read requests from the address unit 9. When a RAM cell is not servicing a DMA request or a read request, it can service a write request from the write request buffer and reordering pipeline 28. If a write request is issued by the address unit 9 when the buffer and reordering pipeline 32 cannot accept further data, then read requests are stalled to allow access for the buffered write requests to be written into the RAM cells. Once there is sufficient space in the buffer and reordering pipeline 28 to accept the new write requests then read requests are allowed to proceed and normal processor operation resumes.

Figure 6:
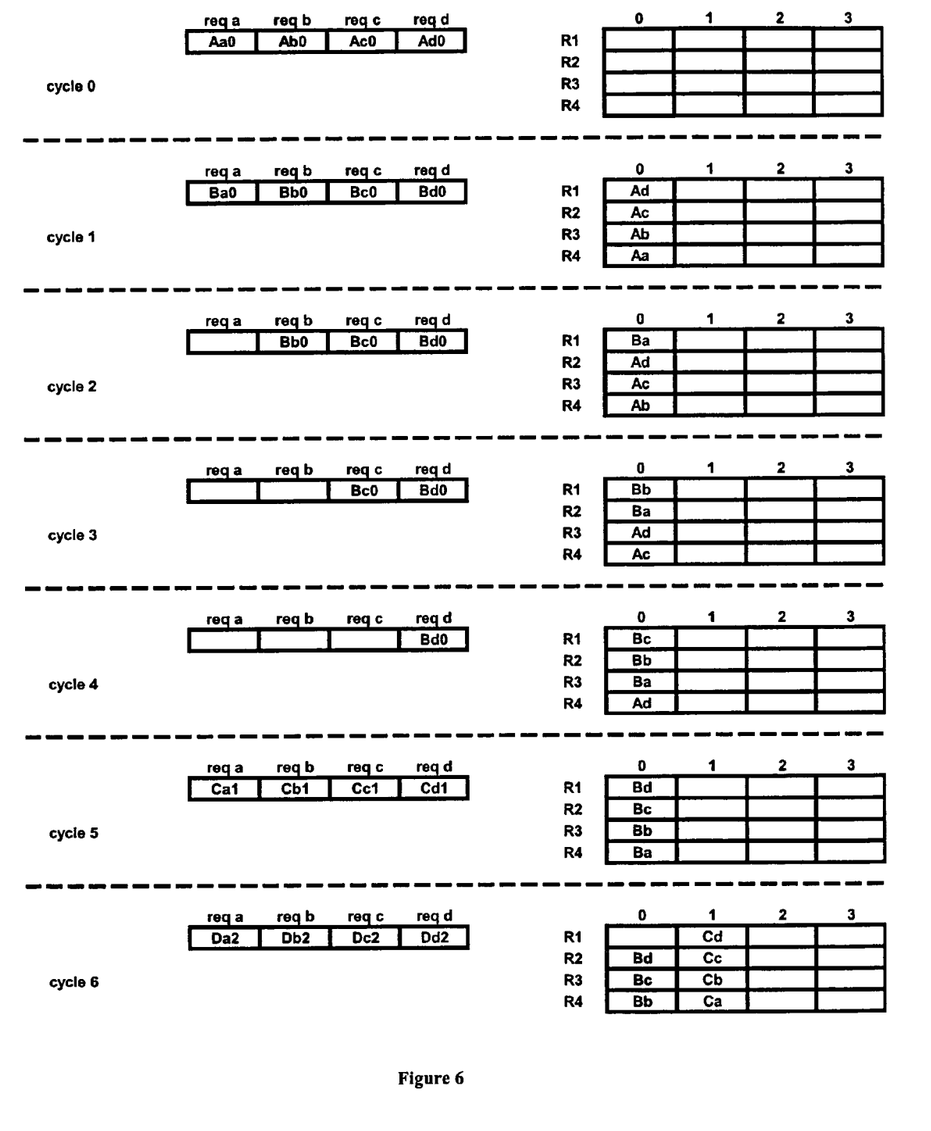
FIG. 6 and FIG. 7 show an example of the structure and operation of the write request pipeline and re-ordering buffer.

FIG. 6 shows one possible arrangement for the internal structure of the write request buffer and reordering pipeline 28, and also shows how its contents evolve over a number of clock cycles. Each cell in FIG. 6 can hold a write request, which consists of an item of data and the address to which it will be written.

Four cells labelled req a, req b, req c and req d hold the four write requests presented to the write request buffer and reordering pipeline 28 in one clock cycle. This group of cells is referred to here as the req cells.

Four rows of four cells labelled R1[0 . . . 3], R2[0 . . . 3], R3[0 . . . 3], R4[0 . . . 3] hold the re-ordered write requests as they propagate towards the cell access request arbiter 29. This group of cells is referred to here as the R cells.

Column 0 of the R cells is allocated to holding write requests which target RAM cell 0. Similarly column 1 targets RAM cell 1, column 2 targets RAM cell 2 and column 3 targets RAM cell 3.

Row R4 of the R cells holds the write requests which may be transferred from the write request buffer and reordering pipeline 28 to the cell access request arbiter 29. Each write request held in the R cells must move to row R4 before it can be transferred out.

There may be full connectivity between the four req cells and the sixteen R cells, so that the content of any req cell may be transferred to any R cell. Alternatively the design may be simplified by reducing the number of connections. If the design is to avoid unnecessary stall cycles then there must be at least one connection from each req cell to each column of R cells. This ensures that any four requests can be accepted into the array of R cells in a single clock cycle unless the R cells already hold requests which block the transfer.

FIG. 6 shows that in cycle 0, the four cells req x hold four independent requests labelled Aa0, Ab0, Ac0 and Ad0, where the first character (A, B, C, D etc) identifies a group of requests which are issued together, the second character (a, b, c, d) identifies the individual request within the group, and the final character (0, 1, 2, 3) identifies the RAM cell targeted by the write request.

FIG. 6 shows that in cycle 1, the write requests labelled Aa0, Ab0, Ac0 and Ad0 have been re-ordered and transferred into the storage cells labelled R1[0], R2[0], R3[0], R4[0]. All of these storage cells are allocated to holding write requests which target RAM cell 0. The 0 suffix is dropped from the request labels, as the destination RAM cell is implicit from the column they occupy. A new group of requests labelled Ba0, Bb0, Bc0 and Bd0 is transferred into the req cells in cycle 1.

In cycle 2, request Aa is transferred from the write request buffer and reordering pipeline 28 to the cell access request arbiter 29, and requests Ab, Ac, Ad shuffle down the column. There is only space for request Ba in column 0 of the R cells, so the other B requests remain in the req cells, blocking the acceptance of further requests.

Column 0 of the R cells continues to shuffle down during cycles 3 and 4. In cycle 5 the req cells are able to accept a new group of requests labelled Ca1, Cb1, Cc1 and Cd1. All of these requests target RAM cell 1, and so they are transferred to column 1 of the R cells on cycle 6, freeing the req cells to accept a new group of requests labelled Da2, Db2, Dc2 and Dd2.

Figure 8:
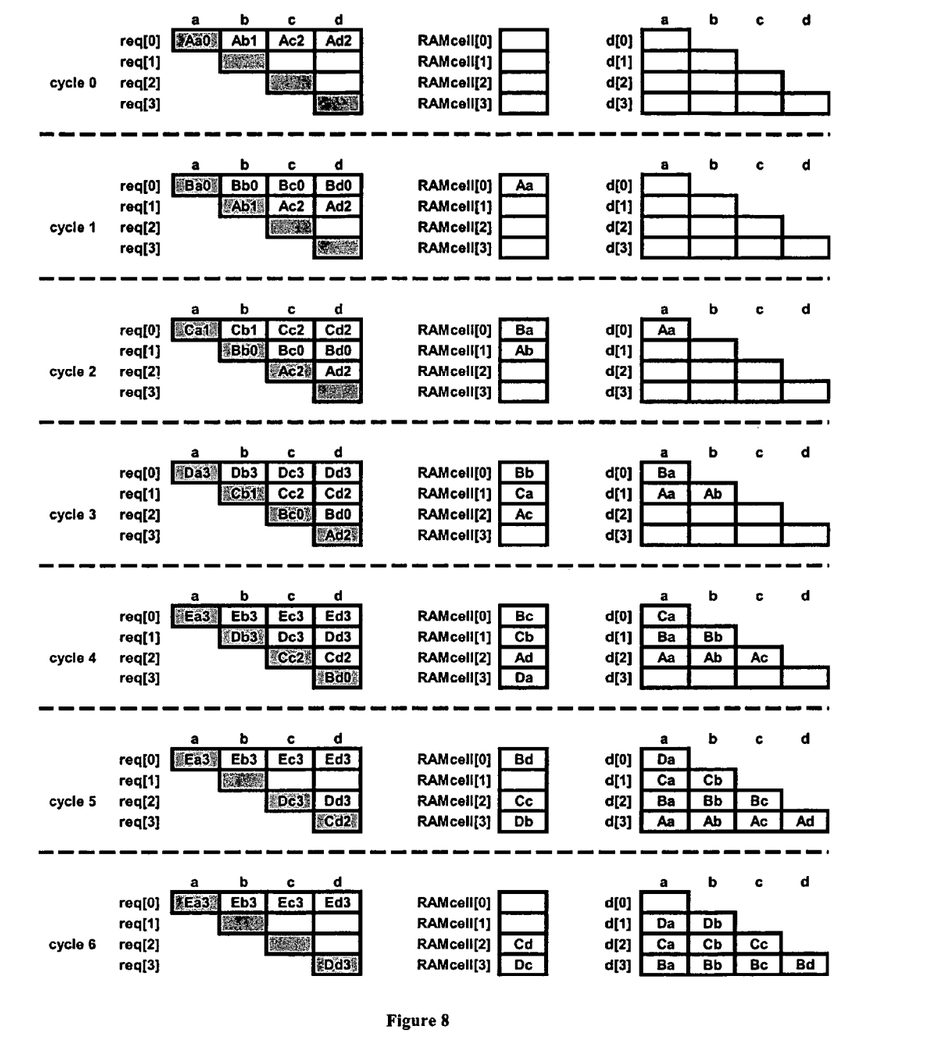
FIG. 8 and FIG. 9 show an example of the structure and operation of the read pipeline and re-ordering buffer.
Figure 9:
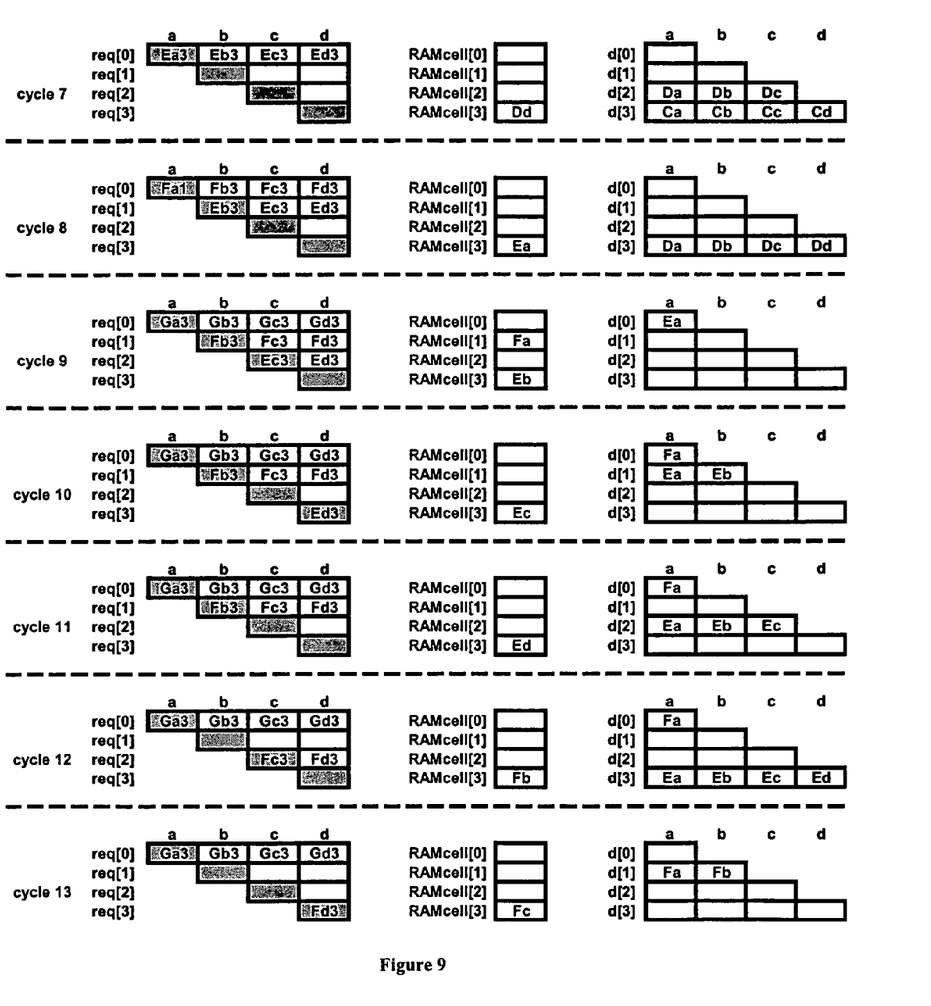

FIG. 8 and FIG. 9 illustrate the operation of the read request pipeline within the cell access request arbiter 29. Read requests are held in an array of cells labelled req[x], where x=0, 1, 2, 3. In each clock cycle the cell access request arbiter 29 attempts to service one individual read request from each row of req, specifically req[3]d, req[2]c, req[1]b and req[0]a, all of which are highlighted in gray in the figures. These read requests are prioritised in the following order:
1. highest priority req[3]d
2. req[2]c
3. req[1]b
4. lowest priority req[0]a If a read request targets a RAM cell that is the target of a higher priority read request, or that is already committed to a different access on this clock cycle, then the read request is not serviced. For each row k in the array req, only when the read request in row k has been serviced do the remaining read requests in req[k] move forward to req[k+1].

When a read request is serviced, a read access is performed on a RAM cell in the block of RAM cells 30. The RAM cells are represented in FIG. 8 and FIG. 9 as the array of cells labelled RAMcell[x], where x=0, 1, 2, 3. The data resulting from a RAM cell read is transferred to the RD return data pipeline 31, which is represented in FIG. 8 and FIG. 9 as the array of cells labelled d[x], where x=0, 1, 2, 3. As each item of data read from the RAM cells is transferred to a row m in array d, that row m moves forward to row m+1. When the read return data reaches row d[3], it holds all the return data for one group of read requests.

In FIG. 8 cycle 0, req[0] holds a group of 4 read requests labelled Aa0, Ab1, Ac2, Ad2 which were all issued on the same clock cycle by the address unit 9. The first character (A, B, C, D etc) identifies a group of requests which are issued together, the second character (a, b, c, d) identifies the individual request within the group, and the final character (0, 1, 2, 3) identifies the RAM cell targeted by the write request.

In cycle 1 the request Aa0 is serviced, resulting in a read of RAMcell[0]. The remaining requests in the A group move forward to req[1], and a new group of requests Ba0, Bb0, Bc0, Bd0 is transferred into req[0].

In cycle 2, the result of read request Aa is transferred into the cell d[0]a in the RD return data pipeline 31. Requests Ab and Ba are serviced by the Ram cells, allowing both the A group and the B group of requests to move forward and a new request group C to be transferred into req.

In cycle 3 and cycle 4, all request groups move forward through the pipeline without stalling, and in cycle 4 all four of the RAM cells are accessed showing full memory read capacity being achieved. This situation can continue as long as there is no conflict between the requests for RAM cells.

In cycle 5 the read pipeline stalls due to a RAM cell being targeted by more than one read request. The RAM cell read requests to be serviced in cycle 5 appear in the highlighted req cells in cycle 4, and inspection shows that both Db3 and Ea3 target RAM cell 3. Request Db3 has the higher priority, so this request is serviced. Request groups B, C and D move forward but request group E does not.

At the end of cycle 5, all four of the read requests in group A have been serviced and the return data is held in row d[3]. In cycle 6 the return data for request group A is transferred out of row d[3] and into its destination, either the data path registers 23 or the load address fixed latency FIFO 15.

In cycle 6 there is still a contention for RAM cell 3, so only request groups C and D move forward while request group E does not. Contention for RAM cell 3 continues until cycle 8, when request Ea is serviced allowing request group E to move forward and request group F enters the pipeline.

Cycle 9 shows request groups E and F moving forward as requests Eb and Fa are serviced. The remaining cycles in FIG. 9 show the stalling that results from all read requests targeting the same RAM cell.

Figure 10:
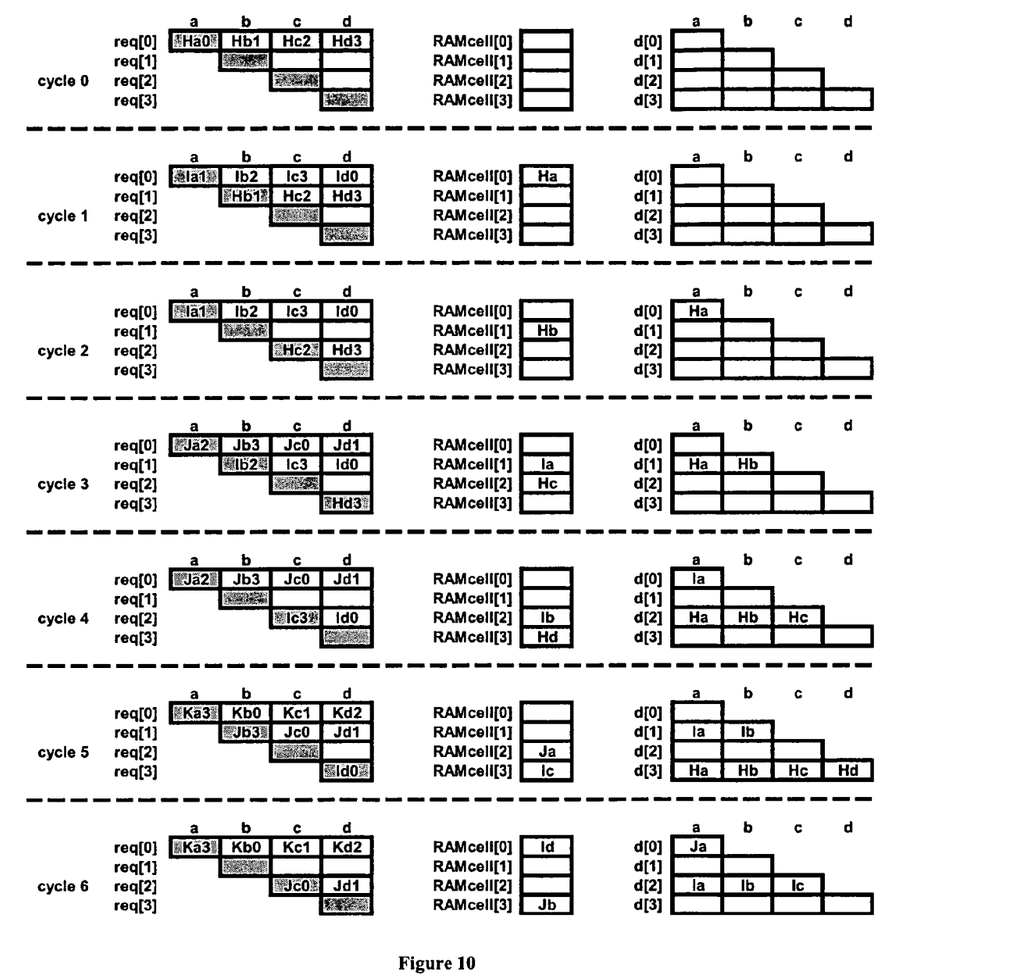
FIG. 10 illustrates stalling that can occur if requests are not presented to the read pipeline in optimum order and FIG. 11 shows how an additional re-ordering step can be applied in order to optimise the performance of such requests.

Following on from the examples given in FIG. 8 and FIG. 9, a further re-ordering step can be applied in order to improve the efficiency of the read pipeline. FIG. 10 illustrates stalling that can occur if requests are not presented to the read pipeline in optimum order. In this example stalls occur once in every two clock cycles.

The optimum order for requests (a, b, c, d) is when they access RAM cells (0, 1, 2, 3). The RAM cell requests shown in FIG. 10 do not follow this pattern. Instead the RAM cells accessed on successive cycles by requesters (a, b, c, d) are {(0, 1, 2, 3), (1, 2, 3, 0), (2, 3, 0, 1), (3, 0, 1, 2), ... }. This access pattern causes RAM cell access contentions to occur on every other cycle, which leads to stalling and consequent loss of available RAM bandwidth. This stalling can be avoided if all requests are re-ordered into the ideal (0, 1, 2, 3) sequence.

Figure 11:
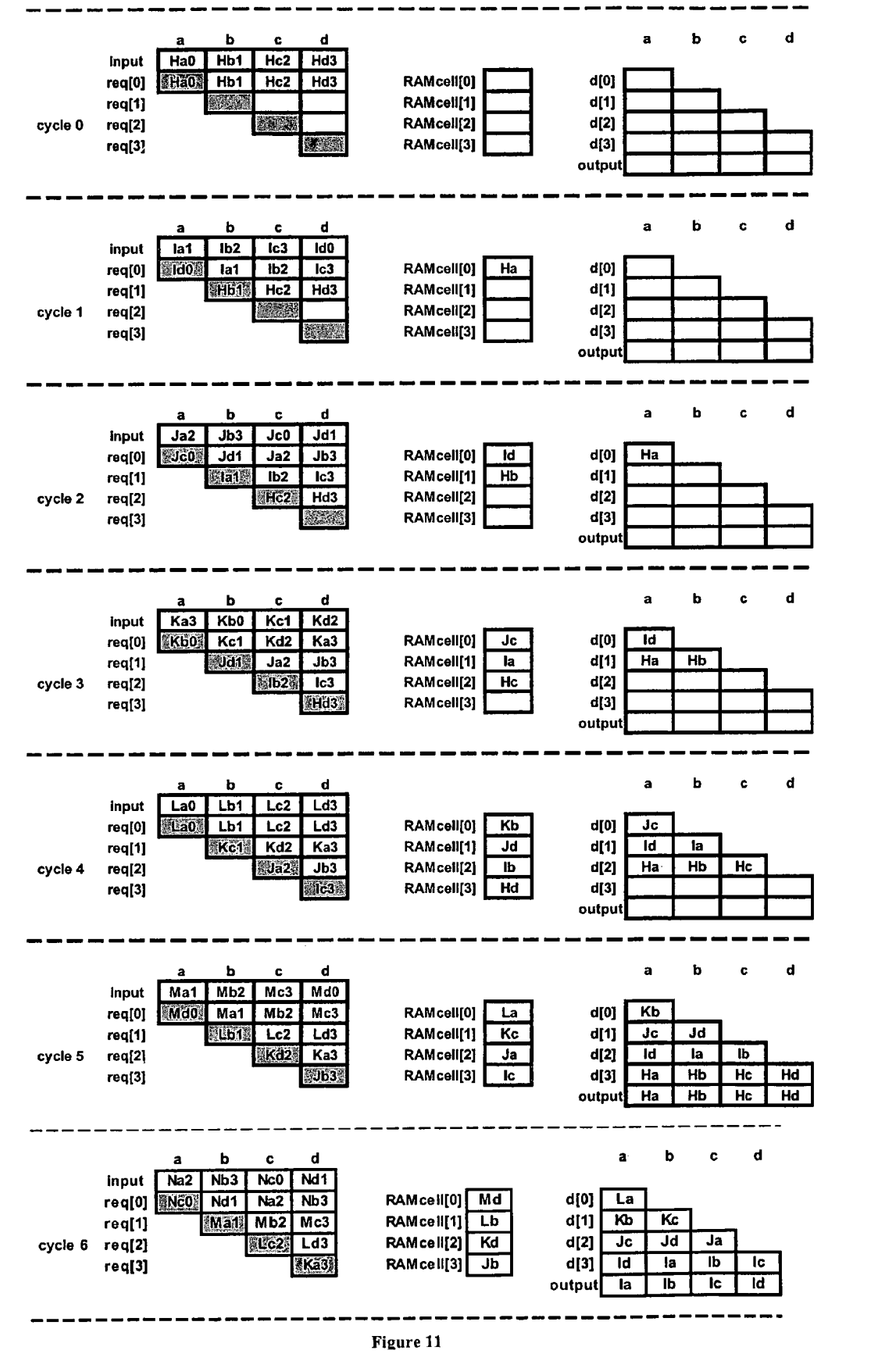

FIG. 11 shows the result of the additional re-ordering step that can be applied in order to optimise the performance of such requests. The additional re-ordering step is shown in FIG. 11 as the transfer from the group of cells labelled "input" to the group of cells labelled "req0". The original request order is recorded in tags that are held with the request and return data as it progresses through the read pipeline. The return data is re-ordered into the original request order using the pipelined request tag before being transferred to its destination. This final reordering step is shown in FIG. 11 as the transfer from the group of cells labelled "d[3]" to the group of cells labelled "output".

Figure 12:
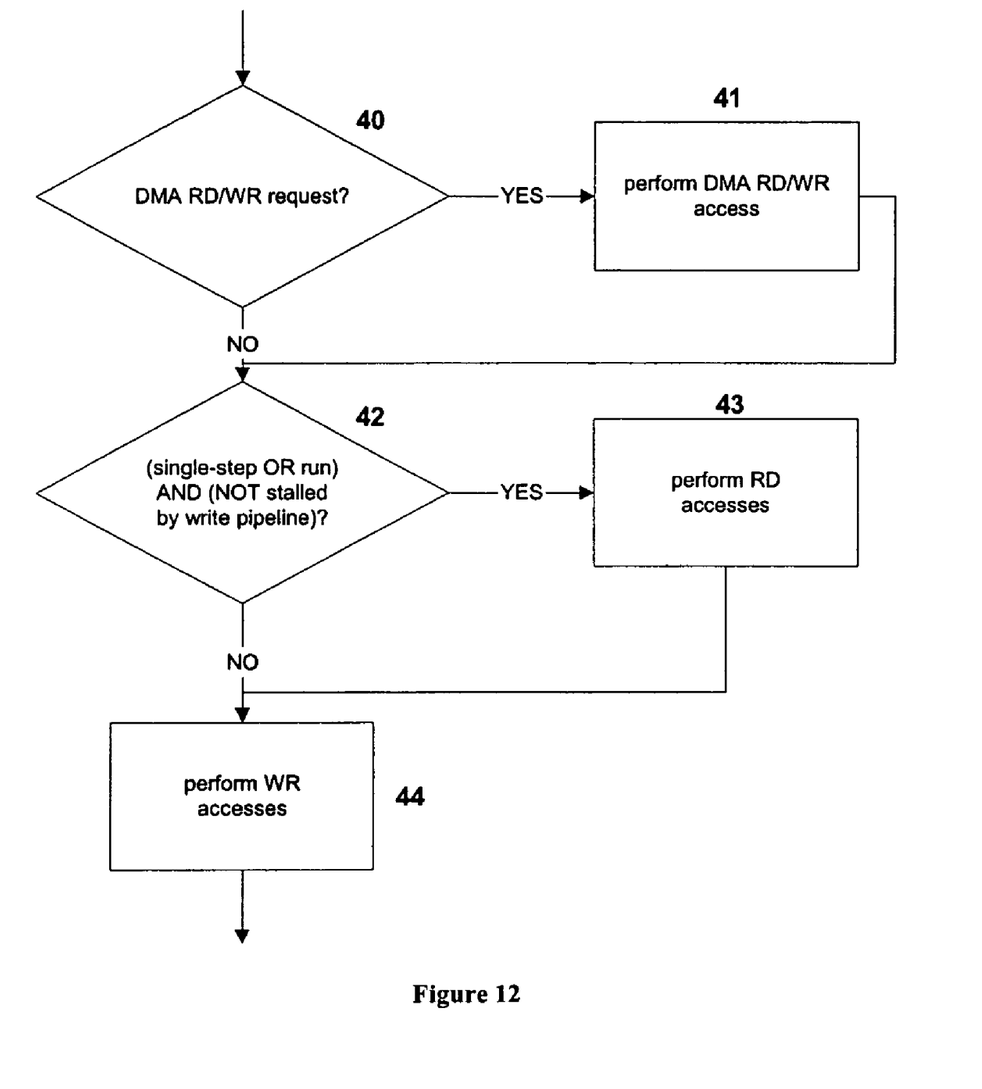
FIG. 12 shows a flow chart for memory requests performed by the cell access request arbiter.

FIG. 12 illustrates the prioritization for memory access requests performed by the cell access request arbiter 29. The flow chart in FIG. 12 is executed once per clock cycle. DMA read and write requests 32 are given the highest priority, and a determination as to whether or not such a request has been received is made at 40. If it has, then the DMA read/write request accessed is performed at 41. After this, and also if no DMA read/write request has been received a determination is made as to whether or not the system is in single-stepped OR run mode and is also not stalled by the write pipeline. If it is, then read accesses are performed at 43 since these have the next highest priority. They are allowed to proceed when the SIMD processor 1 is executing code in run or single-stepped mode and is not stalled by the write request pipeline and reorder unit 28. The lowest priority is given to write requests, except that in cases where the SIMD processor 1 is stalled by the write request pipeline and reorder unit 28 then read requests are inhibited. Write accesses are performed at 44 in the flowchart of FIG. 12.

Figure 13:
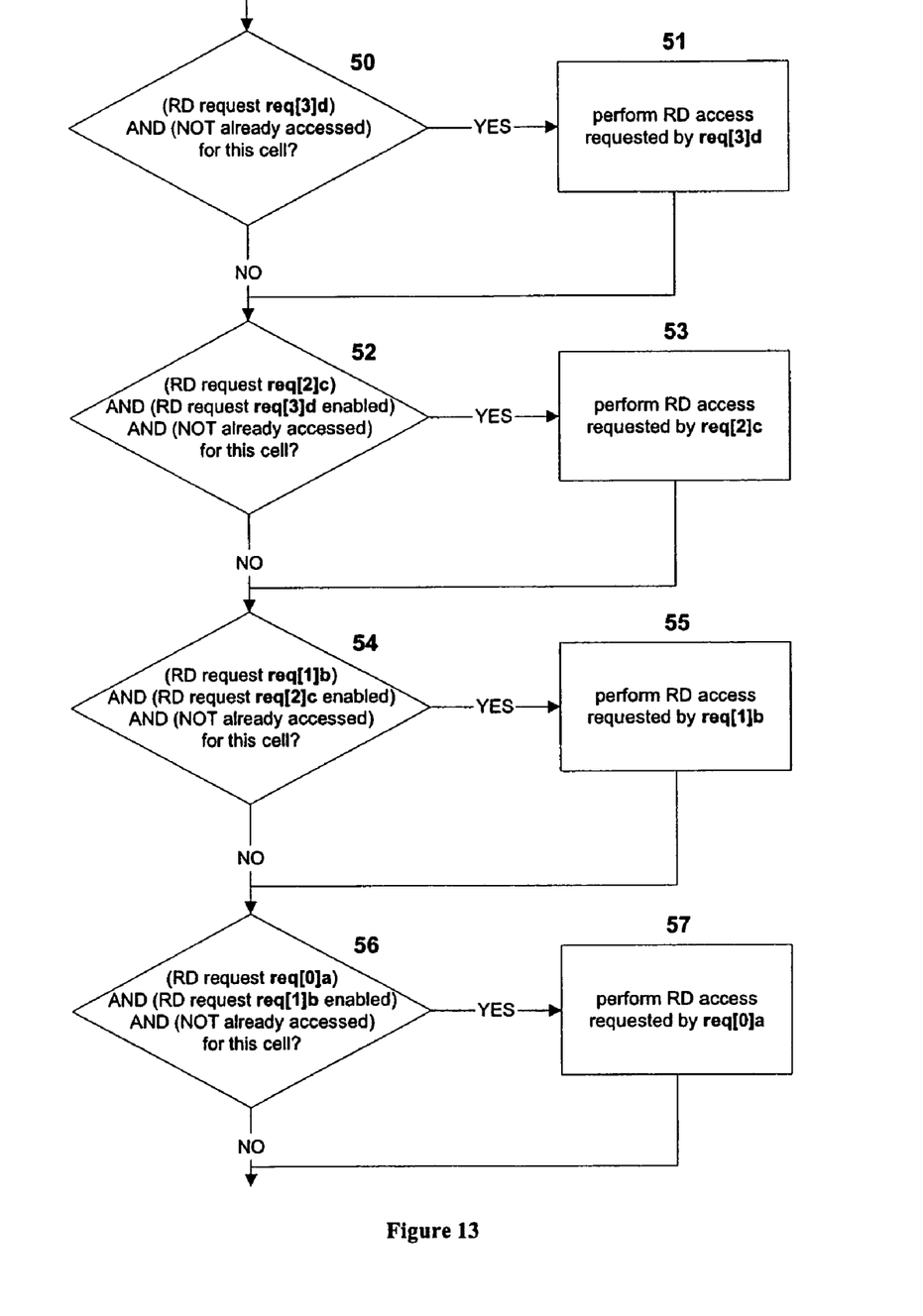
FIG. 13 shows the operation of the cell request arbiter when it is servicing read requests.

The flow diagram of FIG. 13 shows the order of operation of cell access request arbiter 29 when it is serving read requests. This operates the priority of read requests as described in relation to FIGS. 8 and 9.

Figure 7:
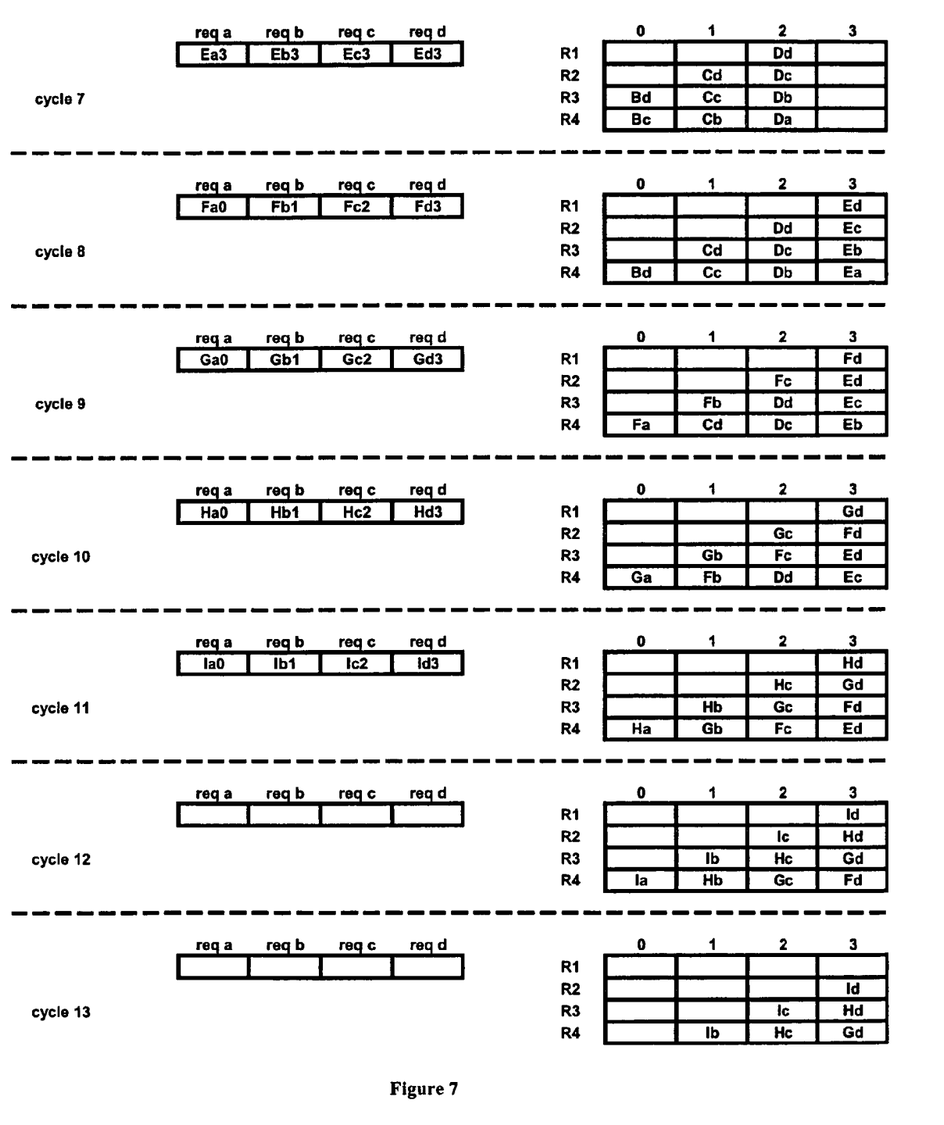
Figure 14:
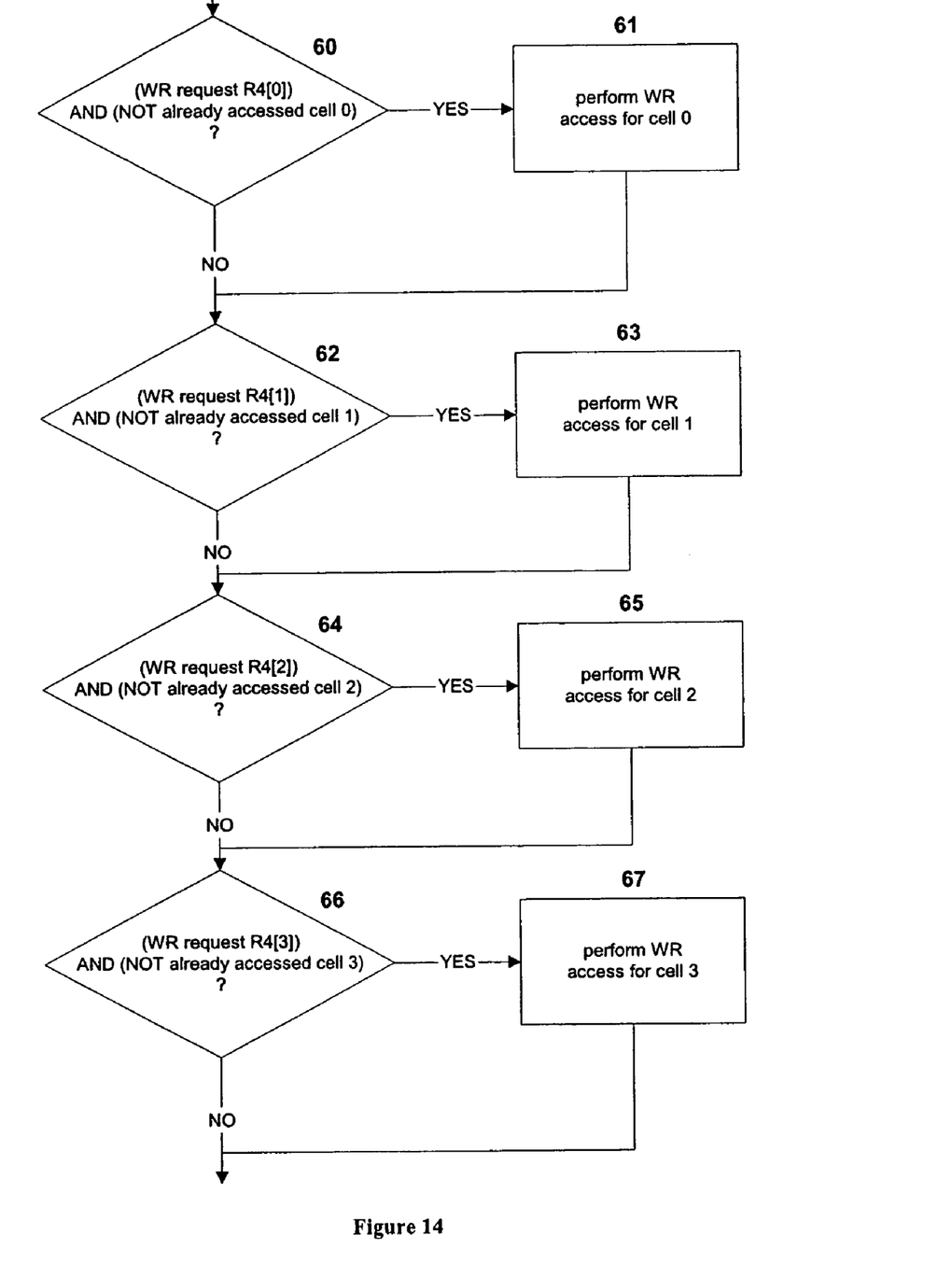
FIG. 14 shows the operation of the cell request arbiter when it is servicing write requests.

Similarly, FIG. 14 shows the operation of cell access request arbiter 29 when it is servicing write requests in as was discussed in relation to FIGS. 6 and 7.

A SIMD processor and memory system could be designed in which fewer than 4 or greater than 4 operations per clock cycle are supported.

There are many possible alternative implementations of the write pipeline and reordering buffer and of the read pipeline and reordering buffer.

An alternative implementation for delay balancing could tag the individual instruction fields that are split and processed with differing latencies in order to ensure the expected data is available for the corresponding operations. This differs from the described example which subjects the individual pipelines to the same delays. The benefits of the approach taken in the example are simplified debug and reduced area, though the design is more complex if the number of separate dependent operations is increased.

Alternative implementations can extend the example by adding extra memory cell requesters and/or more data cells. For example, memory-mapped registers and constant lookup tables could be targeted in addition to the RAM cells in this example.

The system can be adjusted to any system requiring multiple accesses to a unitary memory space in one clock cycle.

What is claimed is:

1. A method for simultaneously reading a plurality of single port memories for use with a single instruction multiple data (SIMD) processor whereby the plurality of memories operates as a multi-port memory comprising the steps of
   sending read requests for a plurality of memory locations to the memories in a known order;
   reordering the read requests to be suitable for application to the single port memories;
   accessing the memories; and
   reordering the data read from the memory locations to match the order of the original requests.

2. A method according to claim 1 in which the plurality of memories are read on a single system clock cycle.

3. A method according to claim 1 including the step of stalling operations of the SIMD processor until the read request has been reordered and applied to the memories.

4. A method according to claim 1 in which the reordering step operates on a stream of memory read requests.

5. A method according to claim 4 in which the reordering step provides memory read requests on each clock cycle when operating in steady state mode.

6. A method according to claim 1 in which memory read requests are given a higher priority than memory write requests.

7. A method for simultaneously writing to a plurality of single port memories for use with a single instruction multiple data (SIMD) processor whereby the plurality of memories operates as a multi-port memory comprising the steps of:
   sending write requests for a plurality of memory locations to the memories in a known order;
   reordering the write requests to be suitable for application to the single port memories; and
   accessing the memories.

8. A method according to claim 7 in which the plurality of memories are accessed on a single system clock cycle.

9. A method according to claim 7 including the step of holding the write requests in a buffer until the requests can be serviced.

10. A method according to claim 7 in which the reordering step operates on a stream of memory write requests.

11. A method according to claim 7 in which the reordering step provides memory write requests to each memory on each clock cycle when operating in steady state mode.

12. A plurality of single port memories for use with an SIMD processor and operable as a multi-port memory with simultaneous access to the plurality of single port memories comprising:
   means for sending an access request for a plurality of memory locations to the memories in a known order;
   means for reordering the access request to be suitable for application to the single port memories;
   means for accessing the memories; and
   means for reordering data read from the memories on an access request.

13. A plurality of single port memories according to claim 12 simultaneously accessible on a single clock cycle.

14. A plurality of single port memories according to claim 12 in which the access request is a read request and including means to stall operation of the SIMD processor until the read request has been reordered by the reordering means.

15. A plurality of single port memories according to claim 12 in which the reordering means operates as a pipeline processor on a stream of memory access requests.

16. A plurality of single port memories according to claim 14 in which the reordering means operating in steady state mode to provide access requests to each memory on each system clock cycle.

17. A plurality of single port memories according to claim 12 including means to assign priorities to access requests.

18. A plurality of single port memories according to claim 17 in which the means to assign priorities assigns a higher priority to read requests than to write requests.

* * * * *